Figure 1:
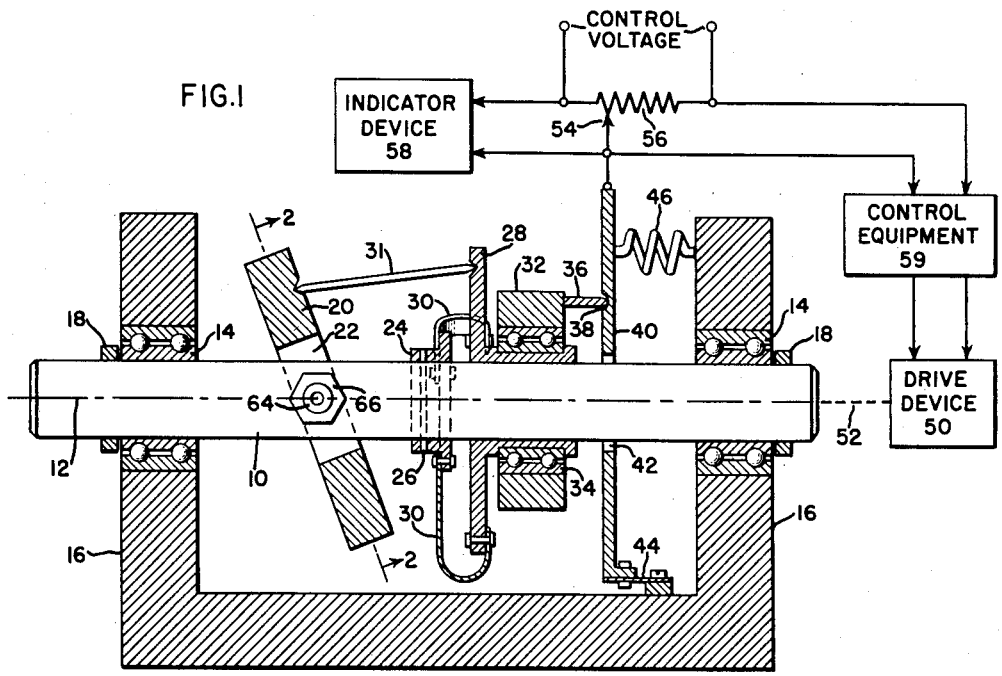

INVENTOR:
CORBIN DIXON

United States Patent Office 2,971,185
Patented Feb. 7, 1961

2,971,185

SPEED INDICATOR AND CONTROL ARRANGEMENT

Corbin Dixon, Waynesboro, Va., assignor to General Electric Company, a corporation of New York Filed Feb. 18, 1959, Ser. No. 794,178

2 Claims. (Cl. 340—263)

The invention relates to a speed indicator and control arrangement, and particularly to such an arrangement for indicating the speed of a rotary drive device or controlling the speed of a rotary drive device.

An object of the invention is to provide an improved arrangement for indicating the speed of or providing a control for a rotary drive device, the arrangement being easy to construct and adjust.

Another object of this invention is to provide a novel device for developing an electrical control signal when the speed of a rotating machine connectable to the device exceeds a predetermined value.

The arrangement in accordance with the invention is primarily intended to be used with an electric motor, although the arrangement can be used with other rotary drive devices. Briefly, the arrangement comprises a rotatable shaft which is supported for rotation about its longitudinal axis. Means are fastened to the shaft for coupling the shaft to the drive device. A rotor plate is fastened to the shaft so that it rotates with the shaft and so that it may pivot about an axis transverse to the longitudinal axis of the shaft. The rotor plate is fastened to the shaft by means of two bearing balls, one ball being positioned on each side of the shaft along the transverse axis. Each ball is held in position by a pair of cooperating sockets which are positioned along the transverse axis. One socket of each pair of sockets is on the shaft and the other socket of each pair of sockets is on the rotor plate adjacent the socket on the shaft. An actuator plate is positioned in the vicinity of the rotor plate and the shaft, this actuator plate being biased by some means so that it tends to move toward the rotor plate. Means are fastened to the rotor plate and contact the actuator plate so that when the shaft is stationary, the actuator plate causes the rotor plate to lie in a plane that forms an angle greater than zero with a plane transverse to the longitudinal axis of the shaft. When the shaft rotates, the rotor plate (as a result of centrifugal force) tends to lie in a plane that is transverse to the longitudinal axis. The resultant movement of the rotor plate causes the actuator plate to move away from the rotor plate in a direction parallel to the longitudinal axis of the shaft by an amount proportional to the speed of rotation of the shaft. This movement of the actuator plate can be used in several ways. For example, the movement may be used to control a switch or current interrupting means which will turn off the drive device when the actuator plate has moved a predetermined distance. Or, the actuator plate may carry a movable arm which engages a potentiometer along its movement, the arm providing a voltage that varies in accordance with the movement of the actuator plate. This variable voltage may be used to provide some sort of indication, or may be used to provide a control signal which provides a gradual control of the drive device.

Figure 2:
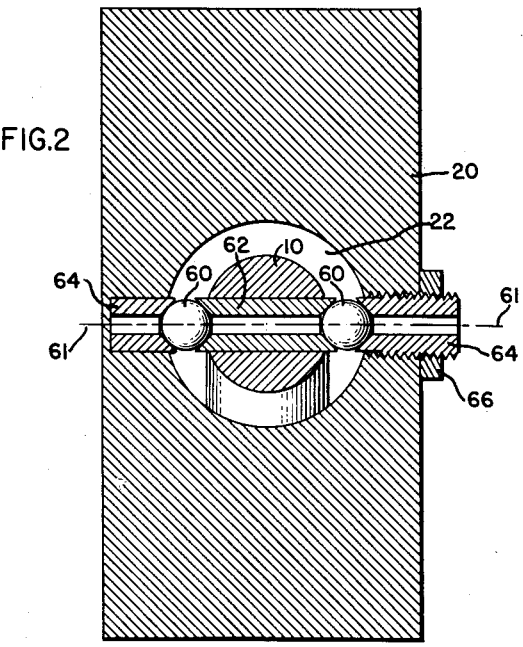

The invention will be better understood from the following description taken in connection with the accompanying drawing, and its scope will be pointed out in the claims. In the drawing:

Figure 1 shows a longitudinal cross-sectional view of a preferred embodiment of the control arrangement in accordance with the invention, and Figure 2 shows a transverse cross-sectional view of a portion of the embodiment shown in Figure 1, the view of Figure 2 being taken along the lines 2—2 of Figure 1.

In the figures, the same reference numerals are used to refer to the same elements. With reference to Figure 1, a cylindrical shaft 10 may be mounted for rotation about its longitudinal axis 12 by means of suitable support bearings 14 which are held by a frame 16. The shaft 10 is prevented from moving along its longitudinal axis 12 by means of suitable retaining rings 18 which are fastened to the shaft 10. A rotor plate 20 is fastened to the shaft between the support bearings 14 in such a manner that the rotor plate 20 rotates with the shaft 10, and so that the rotor plate 20 may pivot about an axis which is transverse to and passes through the longitudinal axis 12 of the shaft 10. The rotor plate 20 may be substantially rectangular and is provided with a symmetrically positioned central opening 22 through which the shaft 10 passes. Since the rotor plate 20 rotates with the shaft 10, it is preferable that the rotor plate 20 be symmetrically positioned with respect to the longitudinal axis 12 of the shaft 10. The novel and improved arrangement for fastening the rotor plate 20 to the shaft 10 will be hereinafter explained in detail in connection with Figure 2. Between the rotor plate 20 and the right-hand support bearing 14, a collar 24 is securely fastened around the shaft 10 by any suitable means, such as a pin 26. To the right of the collar 24, a flanged carrier 28 is positioned around the shaft 10. The flanged carrier 28 has an internal opening which is sufficiently large so that the flanged carrier 28 may slide without excessive friction along the surface of the shaft 10 parallel to the longitudinal axis 12. The flanged carrier 28 is connected to the collar 24 by means of radially extending resilient spring arms 30. The spring arms 30 are connected to the collar 24 and to the flanged carrier 28 so as to provide positive rotation of the flanged carrier 28 with the shaft 10, and at the same time permit the flanged carrier 28 to be moved along the shaft 10 and its longitudinal axis 12. While any convenient number of spring arms 30 may be used, the arrangement shown in Figure 1 contemplates three such arms each extending radially from the shaft 10 and spaced 120 degrees apart. The flanged carrier 28 is also connected to the rotor plate 20 by means of a push bar 31, the push bar 31 preferably lying in a plane which passes through the longitudinal axis 12 of the shaft 10. The push bar 31 is positioned in notches in the flanged carrier 28 and in the rotor plate 20 so that a clockwise rotation (as viewed in Figure 1) of the rotor plate 20 about its transverse axis tends to move the flanged carrier 28 along the longitudinal axis 12 to the right. An actuator ring 32 is positioned around the right-hand portion of the flanged carrier 28 and is held in position by means of a thrust bearing 34. The thrust bearing 34 is designed so that the flanged carrier 28 may rotate independently of the actuator ring 32, and yet so that a positive longitudinal motion is imparted between the flanged carrier 28 and the actuator ring 32. A spring biased actuator plate 40 is positioned to the right of the actuator ring 32. The actuator plate 40, which may have an opening 42 so that it can surround the shaft 10 as shown, is pivoted at a spring pivot 44. An actuator arm 36 is rigidly fastened at one end to the actuator ring 32 so that it moves with the actuator ring 32 within the limits imposed by the flanged carrier 28, the spring arms 30, and the rotor plate 20. The free end of the actuator arm 36 preferably always rests in a depression 38 in the actuator plate 40 so that the actuator ring 32 cannot rotate, but so that longitudinal motion is transferred between the actuator plate 40 and the actuator ring 32. A spiral control spring 46 is compressed and fastened between the actuator plate 40 and the frame 16 so that the actuator plate 40 normally is forced to the left toward the actuator arm 36 and the actuator ring 32, but is prevented from moving toward the actuator ring 32 beyond the limits imposed by the flanged carrier 28, the spring arms 30, the collar 24, and the rotor plate 20.

When the shaft 10 is stationary, the rotor plate 20 is normally positioned in a plane which forms an angle greater than zero with a plane transverse to the longitudinal axis 12 of the shaft 10. When the shaft 10 rotates however, centrifugal force urges the rotor plate 20 to pivot or rotate clockwise (as viewed in Figure 1) about its transverse axis and assume a position such that the rotor plate 20 tends to lie in a plane that is transverse to the longitudinal axis 12. Since the rotor plate 20 is pivoted, the centrifugal force causes it to exert force toward the right against the push bar 31, this force being transmitted to the flanged carrier 28. Since the spring arms 30 are resilient and permit a longitudinal movement of the flanged carrier 28, the carrier 28 is moved away from the rotor plate 20. This movement is transmitted through the thrust bearing 34, the actuator ring 32, and the actuator arm 36 to the actuator plate 40, thus causing the upper portion of the actuator plate 40 to move or pivot to the right against the spiral spring 46. It will be appreciated that the degree of movement of the actuator plate 40 is proportional by some amount to the speed of rotation of the shaft 10.

The movement of the actuator plate 40 can be used in several ways. One way, not shown, would be for this movement to actuate a snap action, push type, on-off switch, the switch being placed in one condition after a certain movement of the actuator plate 40 to the right, and the switch being placed in the other condition in response to movement of the actuator plate 40 to the left. This switch could interrupt a supply power (such as electrical power) to a motor or drive device 50 (such as an electric motor) which is coupled mechanically to the shaft 10 by suitable coupling means 52. Thus, control of the drive device 50 would be provided. Two other uses for the arrangement are shown in Figure 1. A tap arm 54, arranged to slideably engage a potentiometer 56, is fastened to the actuator plate 40. If a suitable control voltage is applied across the potentiometer 56, a variable voltage is provided by the tap arm 54 in response to movement of the actuator plate 40. This variable voltage can be applied to an indicator device 58 such as a lamp. As the tap arm 54 moves to the right in response to a greater speed of the shaft 10, the voltage applied to the indicator device 58 increases. As the tap arm 54 moves to the left in response to a reduced speed of the shaft 10, the voltage applied to the indicator device 58 decreases. The variable voltage supplied by the potentiometer 56 and tap arm 54 can also be applied to control equipment 59 in such a manner that as the tap arm 54 moves to the right (in response to a greater speed of the shaft 10), a decreased voltage is applied to the control equipment 59. The control equipment would in turn supply a decreased amount of power to the drive device 50, thus decreasing its speed without completely cutting off the power supplied to the drive device 50. As the tap arm 54 moves to the left (in response to a reduced speed of the shaft 10), an increased voltage is applied to the control equipment 59. The control equipment 59 would in turn supply an increased amount of power to the drive device 50, thus increasing its speed. Such an arrangement would probably require mechanical damping means such as a dashpot coupled to the actuator plate 40.

An important feature of the invention, shown in detail in Figure 2, is the novel and improved arrangement for fastening the rotor plate 20 to the shaft 10 so that there is positive rotational motion imparted by the shaft 10 to the rotor plate 20, and so that the rotor plate 20 may pivot or rotate about a transverse axis 61. The transverse axis 61 passes through the longitudinal axis 12 and lies in a diameter of the shaft 10. In Figure 2, it will be seen that the rotor plate 20 is supported by and connected to the shaft 10 by a pair of bearing balls 60. One ball 60 is positioned on each side of the shaft 10 along the transverse axis 61. Each of the balls 60 is held in position by a pair of cooperating sockets which are formed in the respective adjacent ends of a shaft pivot bearing 62 and two rotor pivot bearings 64. The bearings 62, 64 lie along the transverse axis 61. Thus, a pair of the cooperating sockets is provided on each side of the shaft 10 along the transverse axis 61. The arrangement is easily assembled and adjusted. One of the rotor bearings 64 may be snugly fitted into a blind hole in one wall of the opening 22 in the rotor plate 20, and the other rotor bearing 64 may be threaded to fit a threaded opening in the opposite wall of the opening 22 in the rotor plate 20. The shaft bearing 62 may be snugly fitted in a hole in the shaft 10. After this easy assembly, the balls 60 are placed in and held by cup-shaped sockets of the bearings 62, 64. Adjustment of the pressure on the balls 60 is easily attained by turning the threaded rotor bearing 64. Once the desired pressure is reached, the threaded rotor bearing 64 may be locked in the position by means of a locking nut 66 or some other suitable device. Thus, it will be seen that the arrangement shown in Figure 2 provides a positive mechanical connection between the shaft 10 and the rotor plate 20 for rotating the rotor plate 20, yet at the same time permits the rotor plate 20 to freely pivot about its transverse axis 61. In addition, the rotor plate 20 can absorb a large thrust or longitudinal force and still pivot freely about the transverse axis 61. And, as already pointed out, this arrangement is easily constructed and adjusted.

From the above description, it will be seen that the arrangement in accordance with the invention may be easily constructed and adjusted, and may be used either for indicating the speed of a rotary drive device or for controlling the speed of a rotary drive device.

While the invention has been described with reference to a particular embodiment, it is to be understood that modifications may be made by persons skilled in the art without departing from the spirit of the invention or from the scope of the claims.

What I claim as new and desire to secure by Letters Patent of the United States is:

1. An arrangement for indicating and controlling the speed of a rotary drive device comprising a rotatable shaft supported for rotation about its longitudinal axis, means for coupling said shaft to said drive device, a rotor plate having a substantially centrally located opening therethrough, said rotor plate and said shaft being positioned with relation to each other so that said shaft passes through said rotor plate opening, means for fastening said rotor plate to said shaft so that said rotor plate rotates therewith and so that two of its opposite ends pivot about an axis transverse to said longitudinal axis, said means for fastening including two bearing balls, one ball being located on each side of said shaft along said pivot axis, each of said balls being positioned in a pair of cooperating sockets which are positioned along said pivot axis, one socket of each of said pairs of sockets being on said shaft and the other socket of each of said pairs of sockets being on the inner wall of said opening, an actuator plate positioned in the vicinity of said rotor plate and said shaft and biased toward said rotor plate, and means fastened to said rotor plate and contacting said actuator plate so that when said shaft is stationary said actuator plate causes said rotor plate to lie in a plane that forms an angle greater than zero with a plane transverse to said longitudinal axis and so that when said shaft rotates said rotor plate tends to pivot toward a plane that is transverse to said longitudinal axis, thereby moving said actuator plate away from said pivot axis along said longitudinal axis by an amount proportional to the speed of rotation of said shaft.

2. The arrangement of claim 1 and further including means coupled to said actuator plate and responsive to movement thereof, said responsive means including an electrical circuit that produces a signal proportional to said movement of said actuator plate.

References Cited in the file of this patent

UNITED STATES PATENTS

| | | |
|---|---|---|
| 255,103 | Deschamps | Mar. 21, 1882 |
| 594,492 | Lederer | Nov. 30, 1897 |
| 1,301,222 | Bruss | Apr. 22, 1919 |
| 1,386,915 | Underhill | Aug. 9, 1921 |
| 1,666,441 | Craft et al. | Apr. 17, 1928 |
| 2,480,856 | Henschke et al. | Sept. 6, 1949 |
| 2,543,877 | Stein | Mar. 6, 1951 |